US010628792B2

(12) United States Patent
Freeman et al.

(10) Patent No.: US 10,628,792 B2
(45) Date of Patent: Apr. 21, 2020

(54) SYSTEMS AND METHODS FOR MONITORING AND RESTOCKING MERCHANDISE (71) Applicant: Walmart Apollo, LLC, Bentonville, AR (US)

(72) Inventors: Joshua Rhys Freeman, Bentonville, AR (US); Jacob Avery Jones, Centerton, AR (US); Winston Earl Delano Spencer, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/856,494

(22) Filed: Dec. 28, 2017

(65) Prior Publication Data

US 2018/0189726 A1 Jul. 5, 2018

Related U.S. Application Data (60) Provisional application No. 62/440,921, filed on Dec. 30, 2016.

(51) Int. Cl.
G06F 16/907 (2019.01)
G06Q 10/08 (2012.01)
(Continued)

(52) U.S. Cl.
CPC ....... G06Q 10/087 (2013.01); G06K 7/10762 (2013.01); G06K 7/1413 (2013.01);
(Continued)

(58) Field of Classification Search
CPC .......................... G06Q 10/087; G06F 16/907
(Continued)

(56) References Cited

U.S. PATENT DOCUMENTS 6,681,990 B2    1/2004 Vogler
7,240,027 B2 *  7/2007 McConnell .......... G06Q 10/087
                                                    705/16

(Continued)

OTHER PUBLICATIONS

UKIPO; App. No. GB1722242.3; Patents Act 1977: Combined Search Report under Section 17(5)(b) and Abbreviated Examination Report under Section 18(3) dated Jun. 14, 2018.
(Continued)

Primary Examiner — Toan C Ly
(74) Attorney, Agent, or Firm — Fitch, Even, Tabin & Flannery LLP (57) ABSTRACT In some embodiments, apparatuses and methods are provided herein useful to monitoring and restocking merchandise in a shopping facility. In some embodiments, there is provided a system including: an array of image sensors disposed about a shopping facility for capturing image sequences; a memory device configured to store the image sequences; a plurality of barcodes disposed on merchandise display containers about the shopping facility; a barcode database including a plurality of barcodes corresponding to merchandise; and a control circuit configured to: compare the image sequences with the images from the image database; determine the presence of a barcode at a display container to identify a type of merchandise in the merchandise display container; and estimate or determine the amount of merchandise in the display container.

18 Claims, 5 Drawing Sheets (51) Int. Cl.
*G06K 7/10* (2006.01)
*G06K 7/14* (2006.01)
*G06K 17/00* (2006.01)
*G06Q 90/00* (2006.01)

(52) U.S. Cl.
CPC ......... *G06K 17/0022* (2013.01); *G06Q 90/00* (2013.01); *G06F 16/907* (2019.01)

(58) Field of Classification Search
USPC ...................................................... 235/375
See application file for complete search history.

(56) References Cited

U.S. PATENT DOCUMENTS

| | | | |
|---|---|---|---|
| 7,693,757 | B2 | 4/2010 | Zimmerman |
| 8,325,036 | B1 | 12/2012 | Fuhr |
| 2008/0077511 | A1* | 3/2008 | Zimmerman .......... G06Q 10/00 705/28 |
| 2009/0063307 | A1 | 3/2009 | Groenovelt |
| 2009/0204512 | A1 | 8/2009 | Connell, II |
| 2015/0213498 | A1* | 7/2015 | Ito ..................... G06Q 30/0261 705/14.58 |
| 2015/0262116 | A1 | 9/2015 | Katircioglu |
| 2017/0193430 | A1* | 7/2017 | Barreira Avegliano .................... G06Q 10/087 |

OTHER PUBLICATIONS

"Intelligent Shelf Compliance Solution Minimizes Inventory Distortion"; Intel; published 2012; pp. 1-6.
"Visual Shelf Monitoring"; Mathecsys; http://mathecsys.com/visualshelfmonitoring/; published 2015, pp. 1-7.
Gottsman, Ed; "Visual Shelf Monitoring: Preventing Apoplexy"; http://www.zdnet.com/article/visualshelfmonitoringpreventingapoplexy/; published Feb. 13, 2008; pp. 1-8.
Moorthy, Rahul, et al.; "On-Shelf Availability in Retailing"; vol. 116—No. 23; International Journal of Computer Applications; Apr. 2015; pp. 47-51.
UKIPO; App. No. GB1722242.3; Patents Act 1977: Examination Report under Section 18(3) dated Oct. 18, 2019.
UKIPO; App. No. GB1722242.3; Patents Act 1977: Examination Report under Section 18(3) dated Jan. 31, 2020.

* cited by examiner

SYSTEMS AND METHODS FOR MONITORING AND RESTOCKING MERCHANDISE

CROSS-REFERENCE TO RELATED APPLICATION

This application claims the benefit of U.S. Provisional Application No. 62/440,921, filed Dec. 30, 2016, which is incorporated by reference in its entirety herein.

TECHNICAL FIELD

This invention relates generally to monitoring and restocking merchandise, and more particularly, to monitoring and restocking merchandise in display containers at shopping facilities.

BACKGROUND

In the retail setting, one important challenge is tracking the levels of merchandise available to customers at shopping facilities. If merchandise levels are not carefully monitored, the merchandise on shelves and on display containers may be completely depleted. If shelves or display containers are empty, customers may not be able to locate desired merchandise without undergoing the inconvenience of asking a store employee if the merchandise is otherwise available. This failure may lead to lost sales as customers decide not to purchase that particular item or go to a different store for the item.

It would therefore be desirable to determine an approach for monitoring and restocking merchandise before shelves or display containers are depleted. Further, it would be desirable to develop an approach where the general frequency of restocking can be predicted. It would be desirable to develop an approach where inputted variables are considered to improve the predictions of times for restocking.

BRIEF DESCRIPTION OF THE DRAWINGS

Disclosed herein are embodiments of systems, apparatuses and methods pertaining to monitoring and restocking merchandise at shopping facilities. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring and restocking merchandise in a shopping facility. In some embodiments, there is provided a system including: an array of image sensors disposed about a shopping facility and configured to capture a plurality of image sequences; at least one memory device configured to store the image sequences captured by the array of image sensors; a plurality of barcodes disposed at a plurality of merchandise display containers about the shopping facility; a barcode database including a plurality of barcodes corresponding to merchandise; and a control circuit operatively coupled to the array of image sensors and the barcode database, the control circuit configured to: compare the image sequences with the predetermined barcodes from the barcode database; determine the presence of at least one barcode at a merchandise display container to identify a type of merchandise in the merchandise display container; and estimate or determine the amount of merchandise in the merchandise display container based on the presence of at least one barcode.

In one form, in the system, the control circuit may compare the image sequences, determine the presence of at least one barcode, and estimate or determine the amount of merchandise at predetermined time intervals. Also, the system may further include: a sales database comprising sales and time data for the type of merchandise in the merchandise display container, wherein the frequency of the predetermined time intervals is determined, at least in part, by the sales and time data. In addition, the system may further include: a weather database comprising temperature and time data corresponding to the type of merchandise in the merchandise display container, wherein the frequency of the predetermined time intervals is determined, at least in part, by the temperature and time data. Moreover, the system may further include: a seasonality database comprising a seasonality value and time data corresponding to the type of merchandise in the merchandise display container, wherein the frequency of the predetermined time intervals is determined, at least in part, by the seasonality value and time data. Also, the system may further include: an events database comprising at least one of holiday, sports, and local events data corresponding to the type of merchandise in the merchandise display container, wherein the frequency of the predetermined time intervals is determined, at least in part, by the at least one of holiday, sports, and local events data.

In one form, in the system, the control circuit may be configured to: instruct communication to an employee of the shopping facility to determine the amount of merchandise in the merchandise display container at the predetermined time intervals; and adjust the predetermined time intervals based on the amount of merchandise in the merchandise display container. Further, the control circuit may be configured to determine that the at least one barcode at the merchandise display container does not correspond to the merchandise in the container.

In another form, there is provided a method for monitoring and restocking merchandise in a shopping facility, the system including: positioning an array of image sensors about a shopping facility; capturing a plurality of image sequences with the array of image sensors; storing the image sequences captured by the image sensors; disposing a plurality of barcodes at a plurality of merchandise display containers about the shopping facility; storing a plurality of predetermined barcodes corresponding to merchandise in a barcode database; comparing the image sequences with the predetermined barcodes from the barcode database; determining the presence of at least one barcode at a merchandise display container to identify a type of merchandise in the merchandise display container; and estimating or determining the amount of merchandise in the merchandise display container based on the presence of at least one barcode.

In another form, there is provided a system for monitoring and restocking merchandise in a shopping facility, the system including: an array of image sensors disposed about a shopping facility and configured to capture a plurality of image sequences; at least one memory device configured to store the image sequences captured by the array of image sensors; a plurality of barcodes disposed about a plurality of merchandise display containers about the shopping facility; a barcode database including a plurality of predetermined barcodes corresponding to merchandise; a sales database comprising sales data for the merchandise in the merchandise display containers; and a control circuit operatively coupled to the array of image sensors, the barcode database, and the sales database, the control circuit configured to: compare the image sequences with the predetermined barcodes from the barcode database; identify a type of merchandise in a merchandise display container; determine an estimate of the amount of merchandise in the merchandise display container based on the image sequences and the sales data at predetermined time intervals; instruct communication to an employee of the shopping facility to determine the amount of merchandise in the merchandise display container at the predetermined time intervals; and adjust the predetermined time intervals based on the amount of merchandise in the merchandise display container.

This disclosure addresses various systems and processes for predicting and determining the restocking of merchandise at shopping facilities. More specifically, the disclosure addresses using barcodes and image sensors to provide real time information regarding the type and amount of merchandise at merchandise locations in the shopping facility. The barcodes are at or inside display boxes or containers holding the merchandise and available to customers. As described further below, the image sensor information, in combination with other factors, may be used to estimate the frequency of restocking required for various types of merchandise and when the merchandise level should be checked by an employee of the shopping facility.

Figure 1:
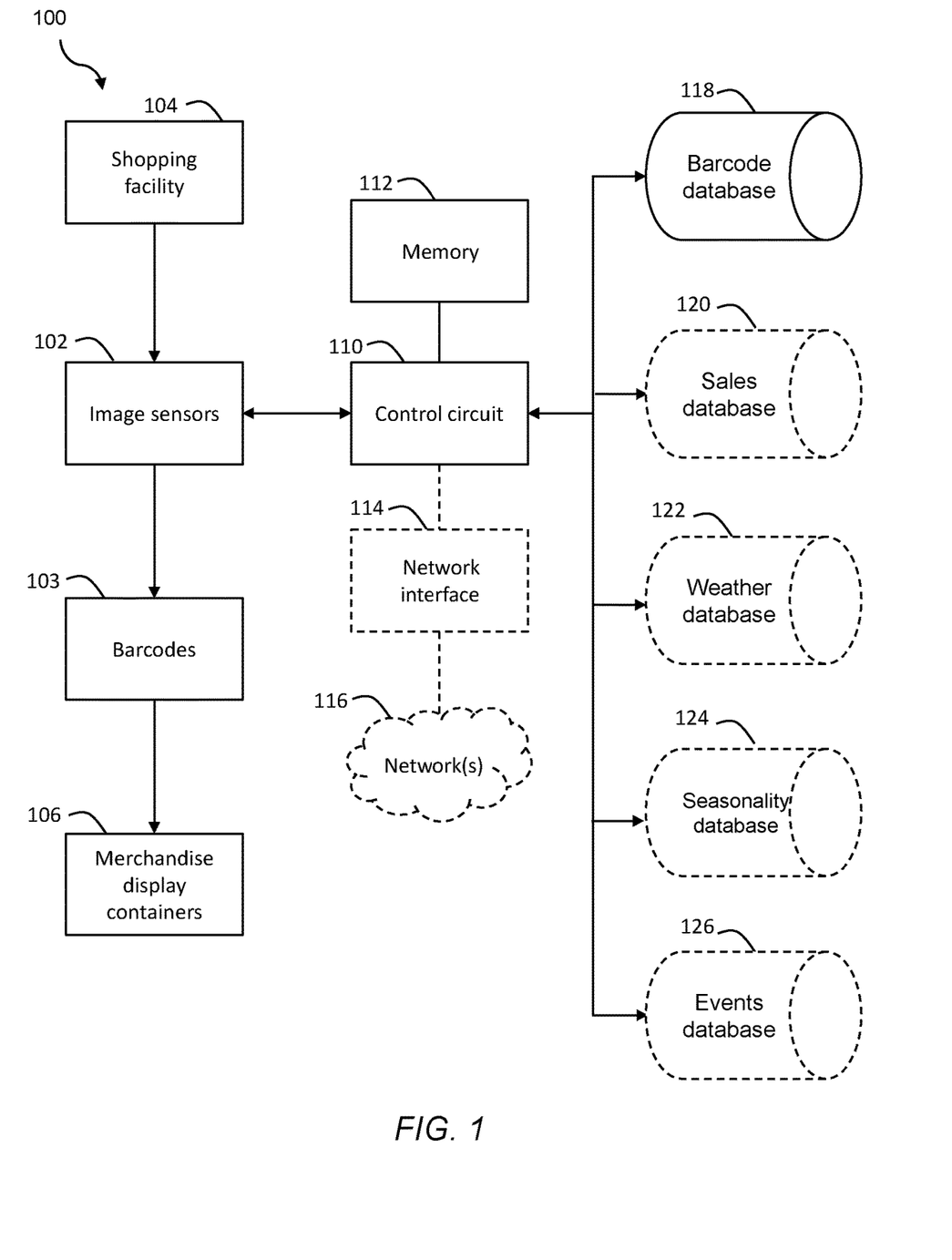
FIG. 1 is a block diagram in accordance with some embodiments.

Referring to FIG. 1, there is shown a system 100 that uses image sensors and barcodes to both identify merchandise and to determine stocking levels. The system 100 generally involves real time monitoring and restocking of product inventory, especially in the display cases/boxes at the front of a store. As described further below, the system 100 may use additional factors and machine learning to develop estimates and predictions of the frequency of restocking, and these estimates are intended to improve over time.

The system 100 includes an array of image sensors 102 disposed about a shopping facility 104 and configured to capture a plurality of image sequences. It is generally contemplated that the image sensors 102 may be any of various types of cameras or video apparatuses. For example, in one form, the array of image sensors 102 may include charged-coupled devices, also referred to as CCD camera(s). These digital imaging devices may be selected to be relatively small in size and provide relatively high-quality image data. Alternatively, it is also contemplated that active-pixel sensors (APS) may be used (which include CMOS APS sensors). These sensors generally provide lower quality image data but may be less expensive than CCD sensors and use less power. The array of sensors 102 may be configured to collect continuous video or to capture still images at predetermined time intervals, such as, for example, once every hour or once every day.

The array of image sensors 102 may be arranged according to any pattern that provides desired coverage of the shopping facility, especially areas of the shopping facility open to customers in which merchandise display containers are located. For example, the image sensors 102 may be arranged according to some grid pattern where one image sensor 102 is disposed a specific distance from other image sensors 102 and such that their angles of coverage complement one another. It is generally contemplated that the array of image sensors 102 will be arranged to provide images of the merchandise display containers 106 (or display cases/boxes) whose product levels are desired to be monitored. In one form, an image sensor 102 may be oriented towards a display container 106 to be monitored and would regularly take pictures/frames/images of the display container 106.

The system 100 also includes barcodes 108 disposed on one or more of the merchandise display containers 106 about the shopping facility 104. It is generally contemplated the barcodes 108 may be disposed on the containers 106 in any of various ways. For example, one or more barcodes 108 may be disposed on the inside of the container 106 such that their visibility to the image sensors 102 may indicate a certain product level. The container 106 may include several barcodes 108 on the inside of the container 106 at positions indicating an ever-decreasing amount of merchandise in the container 106. So, in one form, if all barcodes 108 are visible in the container 106, this visibility may indicate that the merchandise is completely out of stock. Alternatively, the barcodes 108 need not be disposed on the inside of the container 106 but may instead be disposed adjacent to or outside of the container 106.

The system 100 further includes a control circuit 110 that governs the operation of the system 100. The control circuit 110 may be in wired or wireless communication with the image sensor(s) 102 and may control the timing of the capturing of image sequences by the image sensor(s) 102. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

As shown in FIG. 1, the control circuit 110 is coupled to a memory 112 and may be coupled to a network interface 114 and network(s) 116. The memory 112 can, for example, store non-transitorily computer instructions that cause the control circuit 110 to operate as described herein, when the instructions are executed, as is well known in the art. It is also contemplated that the memory 112 may be used to store the image sequences captured by the array of image sensors 102 (although one or more separate memory devices may be used to store the image sequences).

Further, the network interface 114 may enable the control circuit 110 to communicate with other elements (both internal and external to the system 100). This network interface 114 is well understood in the art. The network interface 114 can communicatively couple the control circuit 110 to whatever network or networks 116 may be appropriate for the circumstances. The control circuit 110 may be in communication with the server of the shopping facility 104 and may make use of cloud databases and/or operate in conjunction with a cloud computing platform.

The control circuit 110 is communicatively coupled to a barcode database 118, which includes barcodes 108 corresponding to merchandise. The control circuit 110 compares the image sequences from the image sensor(s) 102 with the barcodes 108 in the barcode database 118. Based on this comparison, it then determines if there is a matching barcode 108 at the merchandise display container 106 to identify the type of merchandise in the merchandise display container 106.

In addition, in one form, the control circuit 110 estimates or determines the amount of merchandise in the merchandise display container 106 based, at least in part, on the presence of barcode(s) in the display container 106 and/or on merchandise. For example, an image sensor 102 (such as a camera) would have a display container 106 (display case/box) in view and regularly take pictures/frames of the display. These images would be analyzed by image processing for light level and if barcode(s) 108 are present in the display container 106. Machine learning would process the data to check the product levels based on the barcodes 108 present in the container 106 and the light level, which may allow an estimate or determination of how much stock of each item is left. It is contemplated that, in certain circumstances, depending on the placement and visibility of merchandise in the container 106, this approach may provide a general estimate of the amount of merchandise in the container 106.

In one form, it is contemplated that the image sequences are processed at certain time intervals. It may not be desirable and may require a significant amount of resources to continually process the image sequences. So, in one form, it is contemplated that the control circuit 110 acts at predetermined time intervals, such as, for example, once every hour or once every day. In other words, the control circuit 110 compares the image sequences with the barcodes 108 in the barcode database 118, determines the presence of barcode(s) 108 at a merchandise display container 106, and determines the amount of merchandise at predetermined time intervals. In summary, in one form, the system 100 includes display containers 106 provided with barcode(s) 108 to identify the contents and the stock limits, and image sensor(s) 102 that scan the barcode(s) 108 to read the contents and detect the stock level at regular time intervals.

One aspect of this disclosure is to generate ever-improving estimates of the time for restocking merchandise in a container 106 and/or when the container 106 should be checked by an employee of the shopping facility 104. In one form, this estimated time for restocking may be intended to predict a time when the merchandise level is low but the container 106 is not yet empty. In this regard, it is contemplated that additional factors may be considered (in addition to the barcode(s) 108), either alone or in various combinations. More specifically, the frequency of time intervals for checking and/or restocking may be determined and adjusted based on factors such as sales, weather, seasonality, and events. By using feedback regarding restocking levels, such as from an employee checking the merchandise level in the container 106, the actual effect of these various factors may be evaluated and predictions may be modified to more accurately reflect this actual effect. As addressed further below, in one form, it is contemplated that machine learning may be used to take the various factors/inputs and predict an output (i.e., time for restocking a particular merchandise item).

As a first example, the frequency of time intervals for checking and/or restocking may be determined based on sales data for that particular merchandise item. In other words, the system 100 may include a sales database 120 that includes sales and time data for the type of merchandise in the merchandise display container 106. Sales of the merchandise item may be evaluated over a certain time period. The frequency of the time intervals for checking and/or restocking may then be determined, at least in part, by the sales and time data.

As a second example, the frequency of time intervals may be determined based on weather data. In other words, the system 100 may include a weather database 122 including temperature and time data corresponding to the type of merchandise in the merchandise display container 106. Actual weather and weather forecasts may be used to predict the effect on certain merchandise levels and the need for restocking. The frequency of the time intervals may be determined, at least in part, by the temperature and time data.

As a third example, the frequency of time intervals may be determined based on seasonality data. In other words, the system 100 may include a seasonality database 124 including a seasonality value and time data corresponding to the merchandise in the merchandise display container 106. The seasonality values correspond to different seasons. For example, if the seasonal value corresponds to winter, the frequency of timer intervals for restocking certain winter items (such as winter apparel) may be adjusted. The frequency of the time intervals may therefore be determined, at least in part, by the seasonality value and time data.

As a fourth example, the frequency of time intervals may be determined based on events data. In other words, the system 100 may include an events database 126 including holiday, sports, and/or local events data corresponding to the type of merchandise in the merchandise display container 106. For example, if the upcoming event is the New Year holiday, the frequency of time intervals for checking/restocking merchandise associated with the New Year holiday may be adjusted. The frequency of the time intervals may be determined, at least in part, by the holiday, sports, and/or local events data.

As addressed above, it is contemplated that the stocking levels of merchandise are checked, such as by employees, and the information from this checking is used to adjust the time intervals of checking and/or restocking. In one form, the control circuit 110 may be configured to instruct communication to an employee of the shopping facility 104 to determine the amount of merchandise in the merchandise display container 106 at the predetermined time intervals. Then, the control circuit 110 may adjust the length of the time intervals based on the amount of merchandise in the merchandise display container 106.

In one form, it is also contemplated that the type of merchandise in the container 106 may be verified as being the correct merchandise type intended for the container 106.

In other words, control circuit 110 may be configured to determine whether the barcode(s) 108 at the merchandise display container 106 do or do not correspond to the merchandise in the container 106. As one example, this may be accomplished by image recognition software and comparison to images of the merchandise or portions thereof. As a second example, the barcode database 118 may also include location data indicating the container location corresponding to merchandise type, so this location data could be used to determine if the barcode(s) 108 detected by the image sensor(s) 102 are correct. Alternatively, an employee checking the container 106 may input barcode data of merchandise that can be correlated to the expected type of merchandise for that container 106.

Figure 2:
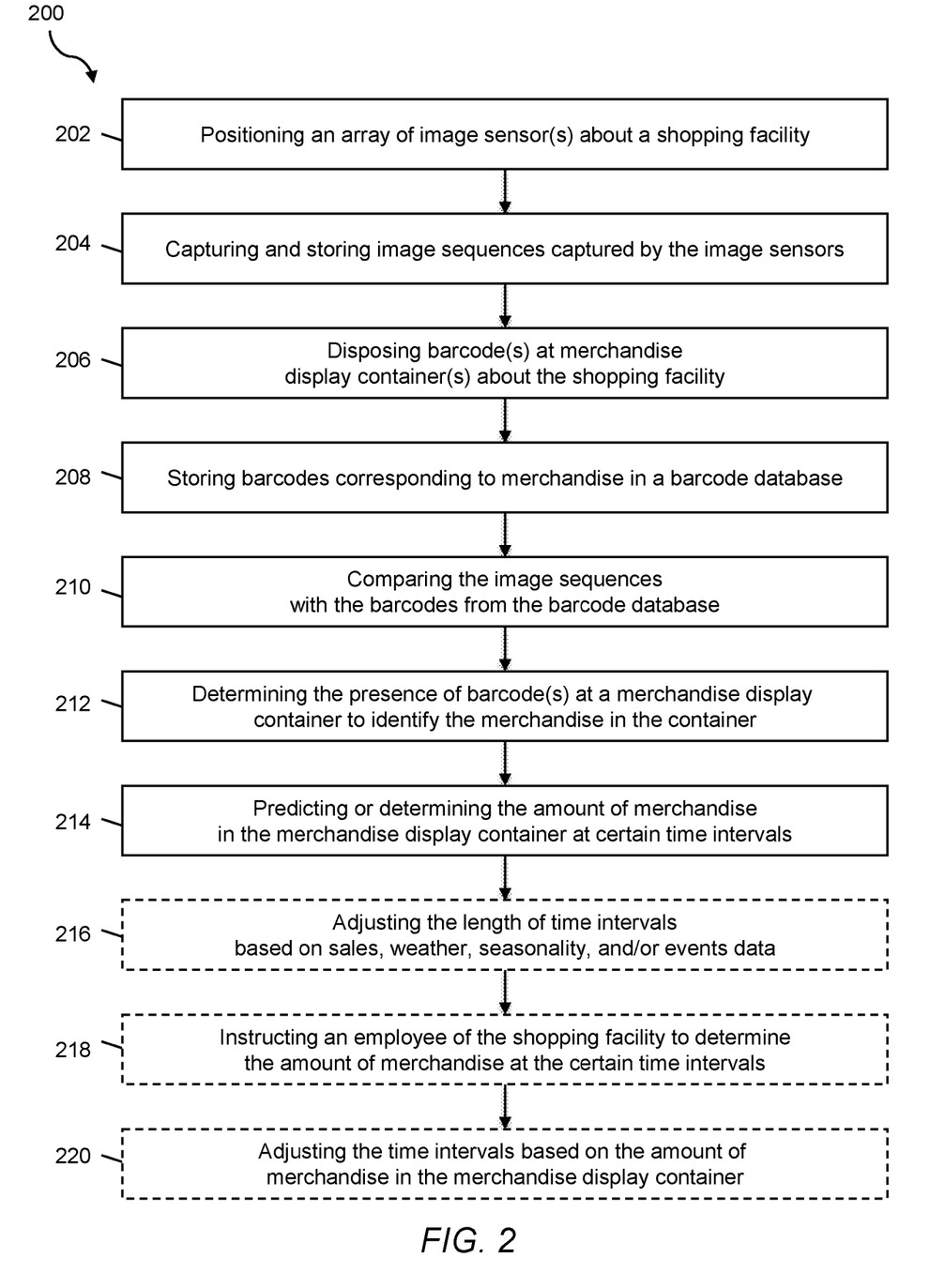
FIG. 2 is a flow diagram in accordance with some embodiments.

FIG. 2 shows a process 200 for monitoring and restocking merchandise in a display container at a shopping facility. The process 200 also involves determining and adjusting a time interval for checking and/or restocking the merchandise. The process 200 makes use of image sensors and barcodes and may use some or all of the components of system 100.

At block 202, an array of image sensor(s) are positioned about the shopping facility. The image sensor(s) may be any of various types of cameras and video apparatuses, such as CCD cameras or APS sensors. They also may be configured to take continuous video or still images (or short videos) at certain time intervals (such as once every hour). It is contemplated that the still images (or short videos) may constitute a more efficient use of resources than continuous video. Further, the array of image sensor(s) may be positioned and oriented according to any desired arrangement that provides desired coverage. For example, the arrangement may be a grid-like arrangement with the image sensor spaced a certain distance from one another and with image sensors oriented in a manner that providing overlapping coverage of customer accessible areas of the shopping facility having the merchandise display containers. At block 204, following positioning of the array of image sensors, image sequences are captured by the image sensors and stored.

At block 206, barcodes are disposed at merchandise display containers about the shopping facility. They may be disposed in, on, or about the merchandise display containers. In one form, it is contemplated that the barcodes are disposed inside the merchandise display containers. Further, one or more barcodes may be disposed at positions inside a merchandise display container that aids with determining the amount of merchandise remaining in the container. Images may be analyzed for light level and if barcode(s) are present in the display container. This approach may provide a general estimate of the amount of merchandise in the container.

At block 208, barcodes corresponding to the merchandise are stored in a barcode database. In one form, it is contemplated that the barcode database may also include location data corresponding to the location of merchandise display containers and the merchandise those containers are intended to hold. At block 210, the image sequences from the image sensors are compared to the barcodes from the barcode database to seek a match. At block 212, the presence of barcodes at a merchandise display container is determined, and the barcode(s) are read to match them to a barcode in the barcode database to identify the merchandise in the container.

At block 214, the amount of merchandise in the merchandise display container is predicted or determined. In one form, the amount may be estimated/determined based, at least in part, on the visibility of barcodes on the inside of the merchandise display container. In another form, it is contemplated that light levels in the container may be used, at least in part, to calculate an estimate of merchandise remaining in the display container. In yet another form, as addressed below, machine learning algorithms may be used to estimate the amount of merchandise remaining in the display container. The amount of merchandise is predicted/determined at certain time intervals, which may be adjusted based, for example, on feedback regarding the accuracy of these time intervals to avoid running out of merchandise in the container.

At block 216, the length of the time intervals may be adjusted based on factors, either alone or in combination, such as sales, weather, seasonality, and/or events. First, the process 200 may use sales and time data for the type of merchandise in the container. Second, the process 200 may use weather data in the form of temperature and time data corresponding to the type of merchandise. Third, the process 200 may use seasonality data in the form of a seasonality value and time data for the merchandise. Fourth, the process 200 may use holiday, sports, and/or local events data indicating demand for the type of merchandise in the display container. The frequency of time intervals for checking and/or restocking may be determined and adjusted based on these factors.

At block 218, an employee of the shopping facility may be instructed to determine the amount of merchandise at the time intervals. In one form, the employee may be verifying the amount shown by the image sensors (if the amount can be determined to a sufficient degree of accuracy based on the image sensors). In another form, the employee may be checking the amount of merchandise predicted by the image sensors and/or other factors and restocking the merchandise display container, if necessary.

At block 220, the time interval for a particular merchandise item and display container may be adjusted based on the amount of merchandise in the container. It is contemplated that the employee may provide feedback regarding the amount of merchandise in the container, which feedback may be used to adjust the effect of various factors on predictions of restocking. The predicted time for restocking may be intended to predict a time when the merchandise level is relatively low but the merchandise display container is not yet empty.

Figure 3:
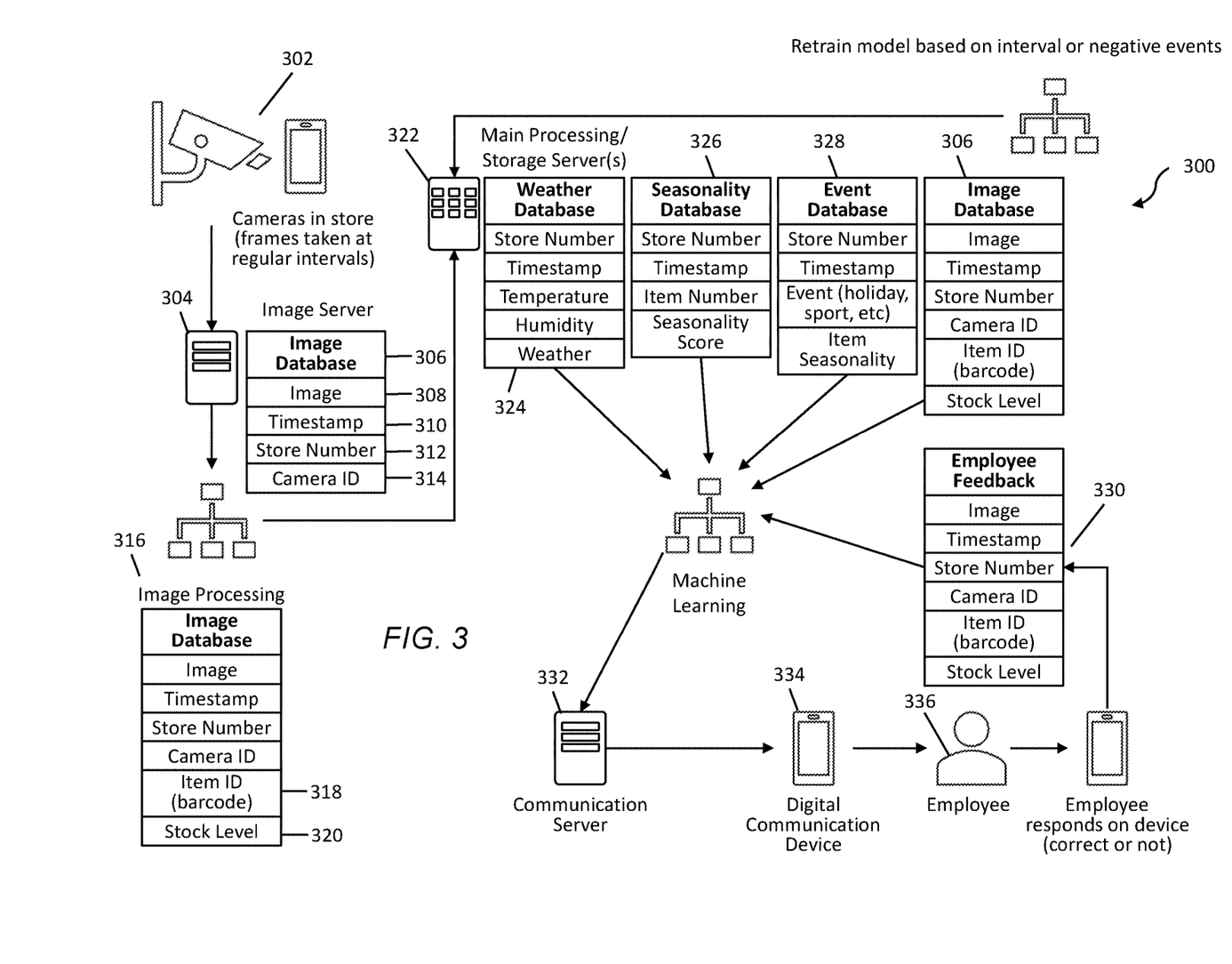
FIG. 3 is a schematic representation in accordance with some embodiments.

Referring to FIG. 3, there is shown a system 300 illustrating components for the monitoring of a merchandise display container at a shopping facility. In this form, the system 300 includes a number of image sensors/cameras 302 in the store with image/frames taken at regular time intervals. For example, the frames may be taken once every hour or once every day. Further, the cameras 302 are preferably arranged in a desired pattern in the store in order to provide suitable coverage for the merchandise display containers being monitored.

The system 300 also includes an image server 304 for handling the images/frames taken by the cameras 302. The image server 304 is communicatively coupled to an image database 306 for the storage of the images/frames. In this form, the image database 306 is organized so that, for each image/frame, it includes the image 308, a timestamp 310 for the image, a store number 312 indicating where the image was taken, and a camera identification 314 indicating the camera that captured the image. In this form, it is contemplated that the image database 306 may be a cloud database (remote from the shopping facility) that stores the images for multiple shopping facilities.

In turn, the image server 304 is coupled to an image processor 316. The image processor 316 acts in conjunction with image server 304 to access the frames/images stored in the image database 306. The image processor 316 stores additional data in fields in the image database. More specifically, the image processor 316 analyzes each individual frame/image, stores a merchandise item identification (barcode) 318 shown in the frame/image, and stores a stock level 320 of merchandise in the display container shown in the frame/image. As can be seen in FIG. 3, the data in this image database 306 is one factor considered by a main processor 322 (or control circuit) in predicting an estimate for checking and/or restocking merchandise in the display container.

Additional factors are also shown in FIG. 3. As a first factor, the system 300 includes a weather database 324 accessible by the main processor 322 (or control circuit). In this form, the weather database 324 is organized so that it includes a store number, a timestamp, temperature data corresponding to the store and time, optional humidity data for that store and time, and other optional weather data. As a second factor, the system 300 includes a seasonality database 326 accessible by the main processor 322. In this form, the seasonality database 326 includes a store number, a timestamp, a merchandise item number, and a seasonality score for that merchandise item. As a third factor, the system 300 includes an event database 328 that can be accessed by the main processor 322. In this form, the event database 328 is arranged so that it includes a store number, a timestamp, an event (holiday, sport, etc.), and an item seasonality value reflecting the effect of the event on various merchandise items.

As fourth factor, the system 300 includes an employee feedback database 330. In this form, the employee feedback database 330 includes the fields of the image database 306: the frame/image 308, the timestamp 310, the store number 312, the camera identification 314, the merchandise item identification (barcode) 318, and the stock level 320. The main processor 322 (or control circuit) is coupled to a communication server 332 to transmit data to the digital communication device 334 of an employee 336. The transmitted data includes, at least, the merchandise item identification (so that the employee knows which merchandise to check) and the estimated stock level based on some or all of the factors described above. The employee then checks the merchandise display container to determine the actual stock level and transmits this data back to the main processor 322. The main processor 322 uses this employee feedback as an additional data point to improve the algorithm for estimation of restocking frequency in accordance with a conventional machine learning approach.

For example, in this form, the system 300 may use a supervised learning approach in which it infers weights to be given to inputted factors based on several examples. Each example includes a set of inputs and a known output value (i.e., the stocking level of the merchandise observed by the employee). A supervised learning algorithm analyzes the examples (or past inputs and corresponding outputs) and generates an inferred function, which can be used to predict new examples (i.e., to predict an output based on new inputs). In this form, the supervised learning approach may employ a training session with illustrative examples during which inputs based on various factors are compared to the actual output (i.e., actual stock levels).

Although some factors have been identified above, additional factors may also be considered by the main processor 322 and the machine learning algorithm. For example, the system 300 may also include a sales database accessible by the main processor 322. The sales database may include a store number, a timestamp, a merchandise item number, and a sales value for that merchandise at that particular store and time.

In summary, in one form, barcodes may be disposed on the inside of a display container/box to allow for a real time snapshot of the item level and product identification. The time for restocking could be predicted using an algorithm to estimate/determine the amount of product left in a display box with the barcodes using one or more image sensors (such as cameras). Factors (local events, weather, seasonality, temperature, holidays, time of day, etc.) may be used to determine the frequency of item checks. Items may also be checked for location using the barcodes located on shelves, the merchandise items, and the display containers. These barcodes may be compared to check for improper stocking of merchandise. An employee may then be notified via a communication method to restock the item.

Machine learning may take inputs from several sources to allow it to learn the demand and restock needs of merchandise items at the individual store level. Image sensors (stationary or on mobile devices) may be used to capture video or images. Video may be broken down into frames (images) and then processed for identification of products and barcodes. Display containers may be modified to allow a barcode to be used to identify the product on the shelves and displays. Boxed items may have a barcode that allow for them to be identified by the image sensors. For displayed items where the items are stored together in a single box (such as, for example, gum), several barcodes might be printed inside the box to allow for a reading of the level of the product inside and the barcode of this item.

Inputs to machine learning might also come from the local weather, social media, transactions from the store, events (holidays, sports, and local), time of day, and store employees. Each of these inputs allow for the machine-learning model to be retrained based on the store's performance. The image may then be processed to detect the barcodes in the environment and identifiers on the product/display in a variety of lighting situations. Machine learning may be used to analyze the product level and identify product based on training data. An image of the shelf empty and an image of it fully stocked with the item might be used as the starting training for the stock levels and retrained as new images are created. A restock level may then be established as some range between empty and fully stocked and stored in a database for each item.

The machine learning algorithm may take into account inputs from the image sensors, store purchases, employee feedback, local events, weather, seasonality, temperature, holidays, time of day, and model retraining. These inputs can be used to retrain the model to adapt to different light levels, restock based on seasonality, weather, holidays and other events. Retraining can also be done based on the feedback from the employees through digital devices. Frequency for checking product level would change based on inputs above allowing for high flow and value items to be in stock more often.

Based on the demand for the items, the ability to restock them, and the restock level, a notification using a communication method may be sent to an employee to restock the item(s). This notification gives the employee the ability to respond to the notification if an item is stocked and does not need to be restocked. Incorrect restock requests created by the system 300 may be saved in a database and used to retrain the algorithm for the item type.

Figure 4:
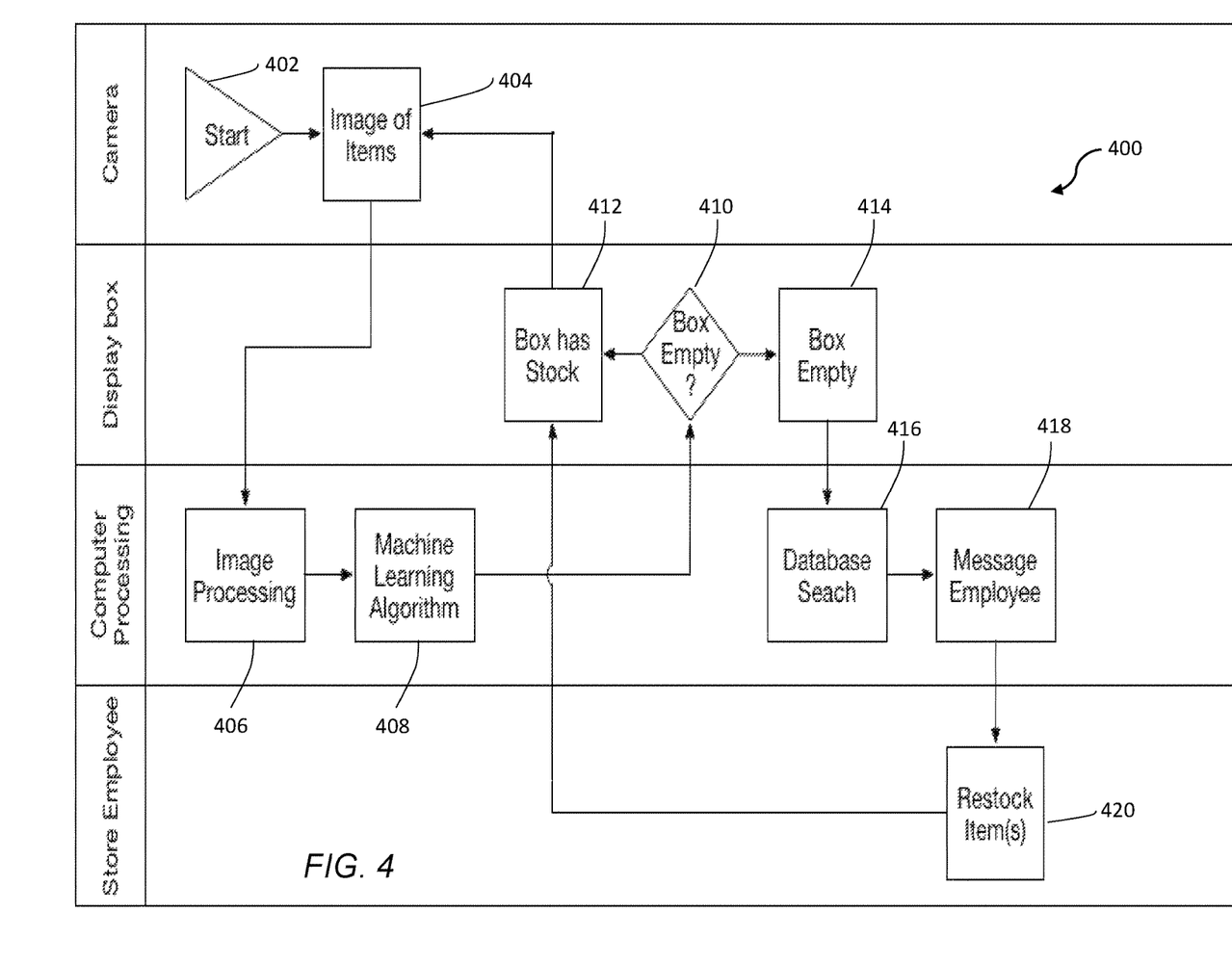
FIG. 4 is a flow diagram in accordance with some embodiments.

FIG. 4 shows a process 400 in which specific actions at or by various components of the process 400 are shown. The process 400 may use some or all the components described in systems 100, 300. At block 402, the start of the process 400 is shown at the camera. The term "camera" in the process 400 is intended to refer broadly to any of various types of cameras or video apparatuses. Further, the camera captures image sequences of a merchandise display box (or container), which may be in the form of video or of still images captured at certain time intervals. At block 404, the process 400 captures image(s) of merchandise items in the display box.

As shown at block 406, the process 400 then continues to image processing 406. More specifically, it is generally contemplated that the image(s) are processed to determine barcodes and stock levels at the display box from the captured image(s). At this step, in one form, it is contemplated that image processing may be performed by image recognition software. Any of various types of image recognition analysis may be applied, and in one form, it is contemplated that the analysis is performed by some sort of pixel matching. For example, the barcodes may be matched to images in a barcode database, and stock levels may also be matched to image(s) in a database of a display box with varying amounts of merchandise showing different degrees of stocking. Image recognition may look at shapes and colors in the images and compare them to an image database of merchandise items and display boxes. This image recognition software and approach may be used in conjunction with systems 100, 300 and processes 200, 500.

At block 408, the process 400 uses a machine learning algorithm to consider the processed image(s). In addition, the algorithm may consider possibly one or more additional factors relating to the merchandise item, such as sales, weather, seasonality, events, and employee feedback. The machine learning algorithm uses the various inputs and makes a determination and/or prediction whether the display box is empty (or nearly empty) or has a sufficient quantity of merchandise remaining in the display box.

At block 410, the next step of process 400 is shown based on the prediction/determination by the machine learning algorithm. At block 412, the algorithm predicts/determines that the display box still has sufficient stock remaining. The process 400 then returns to block 404 where more image(s) are captured of the merchandise items in the display box. In other words, it has been determined/predicted by the algorithm that there is still sufficient stock remaining in the display box so no action need be taken by an employee of the shopping facility. The process 400 then repeats the steps of image processing 406, machine learning 408, and predicting/determining if the box is empty 410 (or nearly empty).

At block 414, the algorithm predicts/determines that the display box is empty (or nearly empty). At block 416, the process 400 conducts a database search to identify the type of merchandise and possibly the location of the display box in the store. At block 418, the process 400 causes the transmission of a message to an employee of the shopping facility, which includes the type of merchandise to be restocked. At block 420, the instruction to the employee is to restock the merchandise items in the display box.

The process 400 then continues to block 412 involving the circumstance where the display box has sufficient stock (because the employee has now restocked the display box). The process 400 then returns to block 404 where more image(s) are captured to monitor stocking level at the display box. The process 400 then repeats the steps of image processing 406, machine learning 408, and predicting/determining if the box is empty 410 (or nearly empty).

Figure 5:
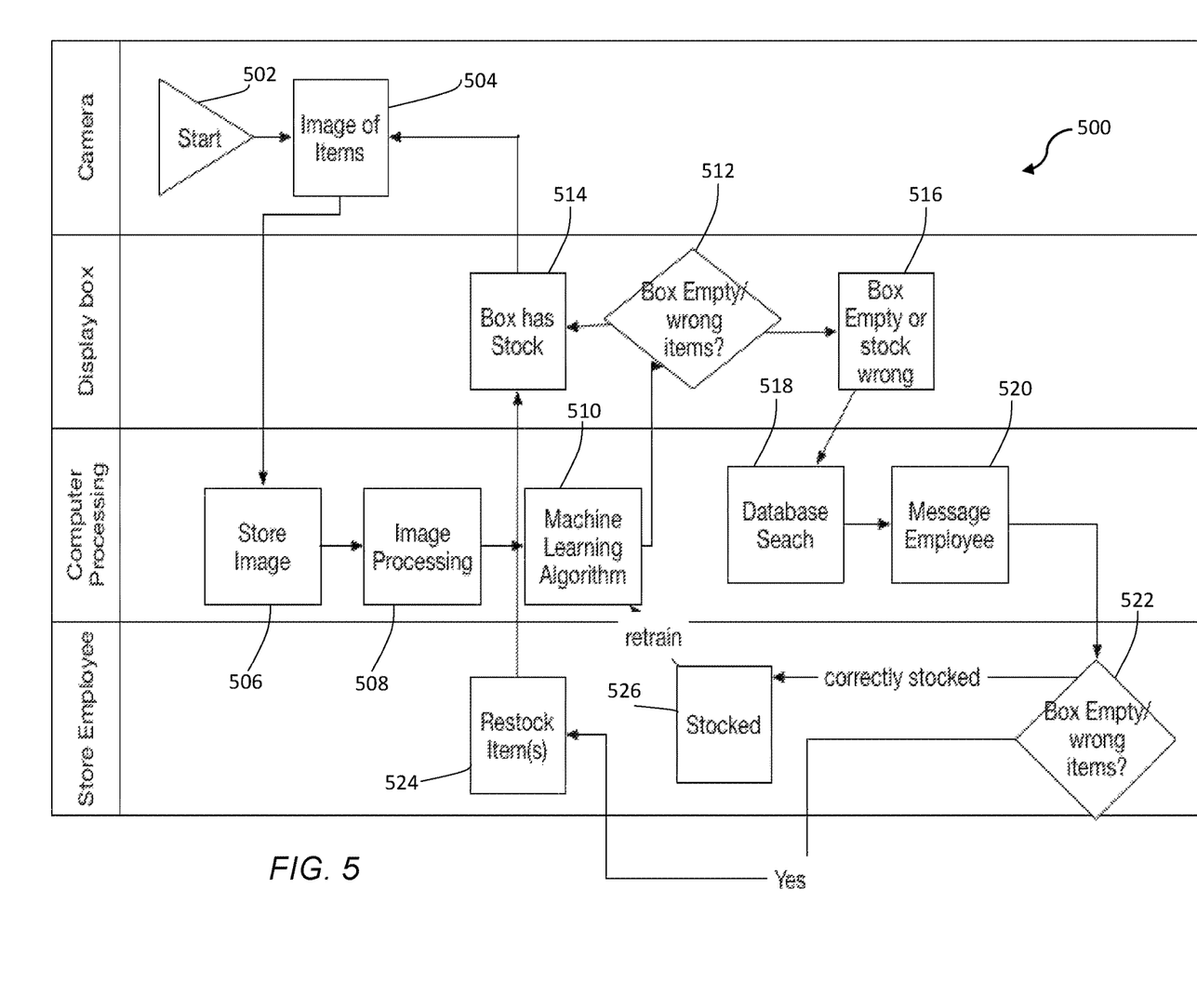
FIG. 5 is a flow diagram in accordance with some embodiments.

Referring to FIG. 5, there is shown a process 500 that is similar to process 400, and the description of process 400 applies equally to process 500, except where indicated otherwise. Process 500, however, includes steps addressing the circumstance where the display box has been incorrectly stocked with or includes merchandise items of the wrong type. FIG. 5 also shows explicitly retraining of the machine learning algorithm where the algorithm has made an incorrect prediction/determination of the stocking level in the display box.

The process 500 starts at block 502. As shown at block 504, the process 500 uses cameras (or video apparatus) to capture image(s) of merchandise items in a display box. At block 506, the image(s) are stored in one or more memory devices. At block 508, the image(s) are processed, which generally involves determining the presence of barcodes and detecting data regarding stock levels at the display box from the captured image(s). It also involves detecting whether the visible merchandise items appear to be of the wrong merchandise type. This determination may be accomplished, for example, by reading barcodes on the visible merchandise items and comparing them to the merchandise intended for the display box. As another example, it may be accomplished using image recognition software that compares images of visible merchandise items to a database with images of the intended merchandise type. For instance, in one form, the user may create an image database to store, for comparison purposes, images of text, symbols, logos, graphic designs, and/or pictures, etc. (including portions thereof), from known merchandise items. These images of text, symbols, logos, graphic designs, and/or pictures from known merchandise items may be compared to image sequences from the image sensor(s).

At block 510, a machine learning algorithm makes a prediction/determination of the stock level in the display box and whether the display box needs to be restocked. The algorithm may use additional factors in making this prediction/determination, such as sales, weather, seasonality, events, and employee feedback. It also, based on the image processing, makes a determination of the type of visible merchandise items in the display box. So, as can be seen at block 512, it makes two decisions: amount of merchandise and type of merchandise.

On one hand, the process 500 then continues to block 514 if no incorrect merchandise items are determined to be present in the display box and if the prediction/determination of merchandise quantity is that the display box still has sufficient stock. In other words, the process continue to block 514 if a determination is made that no employee action is required. The process 500 then essentially starts over and repeats steps 504, 506, 508, 510, and 512.

On the other hand, the process 500 continues to block 516 if there is a prediction/determination either that the display box contains one or more incorrect merchandise items or that the display box is empty (or is below a minimum predetermined amount of stock). In other words, employee action will be required. At block 518, a database search is made to match the detected barcodes and identify the type of merchandise (and possibly the location of the display box in the store). At block 520, a message is transmitted to an employee of the shopping facility. This message may simply indicate that the display box should be checked, or it may communicate the prediction/determination whether the display box includes incorrect merchandise items and/or whether it needs more merchandise.

At block 522, the employee checks the display box and determines if it needs more merchandise and if it includes merchandise of the wrong type. If the process 500 correctly determines that display box needs more merchandise, i.e., it is empty (or below a minimum threshold) or it includes incorrect merchandise, the employee performs the restocking, as shown at block 524. The process 500 then is essentially started over by continuing to steps 514, 504, 506, 508, 510, and 512.

On the other hand, if employee determines that the display box is correctly stocked and does not need restocking (the display box has a sufficient quantity of the correct type of merchandise), the process 500 continues to block 526. In this circumstance, the algorithm has made an incorrect prediction/determination, and accordingly, the process 500 retrains the machine learning algorithm at block 510. The process 500 then continues to block 512.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring and restocking merchandise in a shopping facility, the system comprising:
   a plurality of display boxes disposed in a shopping facility, each display box configured to hold one type of merchandise;
   an array of image sensors disposed at predetermined positions about the shopping facility according to a predetermined pattern and configured to capture a plurality of image sequences, the image sensors arranged and oriented to capture image sequences of merchandise stored inside the plurality of display boxes;
   at least one memory device configured to store the image sequences captured by the array of image sensors;
   a plurality of barcodes disposed inside each of the plurality of display boxes about the shopping facility, the barcodes inside each display box disposed at a plurality of positions inside the display box indicating a certain amount of merchandise remaining in the display box;
   a barcode database including a plurality of barcodes corresponding to merchandise;
   a control circuit operatively coupled to the array of image sensors and the barcode database, the control circuit configured at predetermined time intervals to:
      compare the image sequences with the predetermined barcodes from the barcode database;
      determine the presence of at least one barcode in a display box to identify a type of merchandise in the display box;
      generate an estimate of the amount of merchandise in the display box based on the plurality of positions of the barcodes inside each display box; and
      generate and transmit a notification to instruct restocking of the display box with the identified merchandise when the estimate falls below a predetermined minimum amount.

2. The system of claim 1, further comprising:
   a sales database comprising sales and time data for the type of merchandise in the display box;
   wherein the frequency of the predetermined time intervals is determined, at least in part, by the sales and time data.

3. The system of claim 1, further comprising:
   a weather database comprising temperature and time data corresponding to the type of merchandise in the display box;
   wherein the frequency of the predetermined time intervals is determined, at least in part, by the temperature and time data.

4. The system of claim 1, further comprising:
   a seasonality database comprising a seasonality value and time data corresponding to the type of merchandise in the display box;
   wherein the frequency of the predetermined time intervals is determined, at least in part, by the seasonality value and time data.

5. The system of claim 1, further comprising:
   an events database comprising at least one of sports and local events data corresponding to the type of merchandise in the display box;
   wherein the frequency of the predetermined time intervals is determined, at least in part, by the at least one of sports and local events data.

6. The system of claim 1, wherein the control circuit is configured to:
   instruct communication to an employee of the shopping facility to determine the amount of merchandise in the display box at the predetermined time intervals;
   adjust the predetermined time intervals based on the amount of merchandise in the display box.

7. The system of claim 1, wherein the control circuit is configured to determine that the at least one barcode in the display box does not correspond to the merchandise in the display box.

8. A method for monitoring and restocking merchandise in a shopping facility, the method comprising:
   disposing a plurality of display boxes in a shopping facility, each display box configured to hold one type of merchandise;
   positioning an array of image sensors at predetermined positions about the shopping facility according to a predetermined pattern, the image sensors arranged and oriented to capture image sequences of merchandise stored inside a plurality of display boxes;
   capturing a plurality of image sequences with the array of image sensors;
   storing the image sequences captured by the image sensors;
   disposing a plurality of barcodes inside each of the plurality of display boxes about the shopping facility, the barcodes inside each display box disposed at a plurality of positions inside the display box indicating a certain amount of merchandise remaining in the display box;
   storing a plurality of predetermined barcodes corresponding to merchandise in a barcode database;
   comparing the image sequences with the predetermined barcodes from the barcode database at predetermined time intervals;
   determining the presence of at least one barcode in a display box to identify a type of merchandise in the display box;
   generating an estimate of the amount of merchandise in the display box based on the plurality of positions of the barcodes inside each display box; and
   generating and transmitting a notification to instruct restocking of the display box with the identified merchandise when the estimate falls below a predetermined minimum amount.

9. The method of claim 8, wherein the frequency of the predetermined time intervals is determined, at least in part, by sales and time data for the type of merchandise in the display box.

10. The method of claim 8, wherein the frequency of the predetermined time intervals is determined, at least in part, by weather data comprising temperature and time data corresponding to the type of merchandise in the display box.

11. The method of claim 8, wherein the frequency of the predetermined time intervals is determined, at least in part, by a seasonality value and time data corresponding to the type of merchandise in the display box.

12. The method of claim 8, wherein the frequency of the predetermined time intervals is determined, at least in part, by at least one of sports and local events data corresponding to the type of merchandise in the display box.

13. The method of claim 8, further comprising:
instructing communication to an employee of the shopping facility to determine the amount of merchandise in the display box at the predetermined time intervals; and
adjusting the predetermined time intervals based on the amount of merchandise in the display box.

14. The method of claim 8, further comprising determining whether the at least one barcode at the display box corresponds to the merchandise in the display box.

15. A system for monitoring and restocking merchandise in a shopping facility, the system comprising:
a plurality of display boxes disposed in a shopping facility, each display box configured to hold one type of merchandise;
an array of image sensors disposed at predetermined positions about the shopping facility according to a predetermined pattern and configured to capture a plurality of image sequences, the image sensors arranged and oriented to capture image sequences of merchandise stored inside the plurality of display boxes;
at least one memory device configured to store the image sequences captured by the array of image sensors;
a plurality of barcodes disposed inside each of the plurality of display boxes about the shopping facility, the barcodes inside each display box disposed at a plurality of positions inside the display box indicating a certain amount of merchandise remaining in the display box;
a barcode database including a plurality of predetermined barcodes corresponding to merchandise;
a sales database comprising sales data for the merchandise in the display boxes;
a control circuit operatively coupled to the array of image sensors, the barcode database, and the sales database, the control circuit configured at predetermined time intervals to:
compare the image sequences with the predetermined barcodes from the barcode database;
identify a type of merchandise in a display box;
generate an estimate of the amount of merchandise in the display box based on the image sequences showing the plurality of positions of the barcodes inside each display box and based on the sales data;
generate and transmit a notification to an employee of the shopping facility to determine the amount of merchandise in the display box; and
adjust the predetermined time intervals based on the amount of merchandise in the display box.

16. The system of claim 15, further comprising:
a weather database comprising temperature and time data corresponding to the type of merchandise in the display box;
wherein the frequency of the predetermined time intervals is determined, at least in part, by the temperature and time data.

17. The system of claim 15, further comprising:
a seasonality database comprising a seasonality value and time data corresponding to the type of merchandise in the display box;
wherein the frequency of the predetermined time intervals is determined, at least in part, by the seasonality value and time data.

18. The system of claim 15, further comprising:
an events database comprising at least one of sports and local events data corresponding to the type of merchandise in the display box;
wherein the frequency of the predetermined time intervals is determined, at least in part, by the at least one of sports and local events data.

* * * * *